July 16, 1968

W. RODDER 3,392,565

MANUFACTURE OF SEAMLESS TUBING

Filed Feb. 15, 1965

INVENTOR.
WILLIAM RODDER
BY Bosworth, Sessions,
Herrstrom & Knowles
ATTORNEYS.

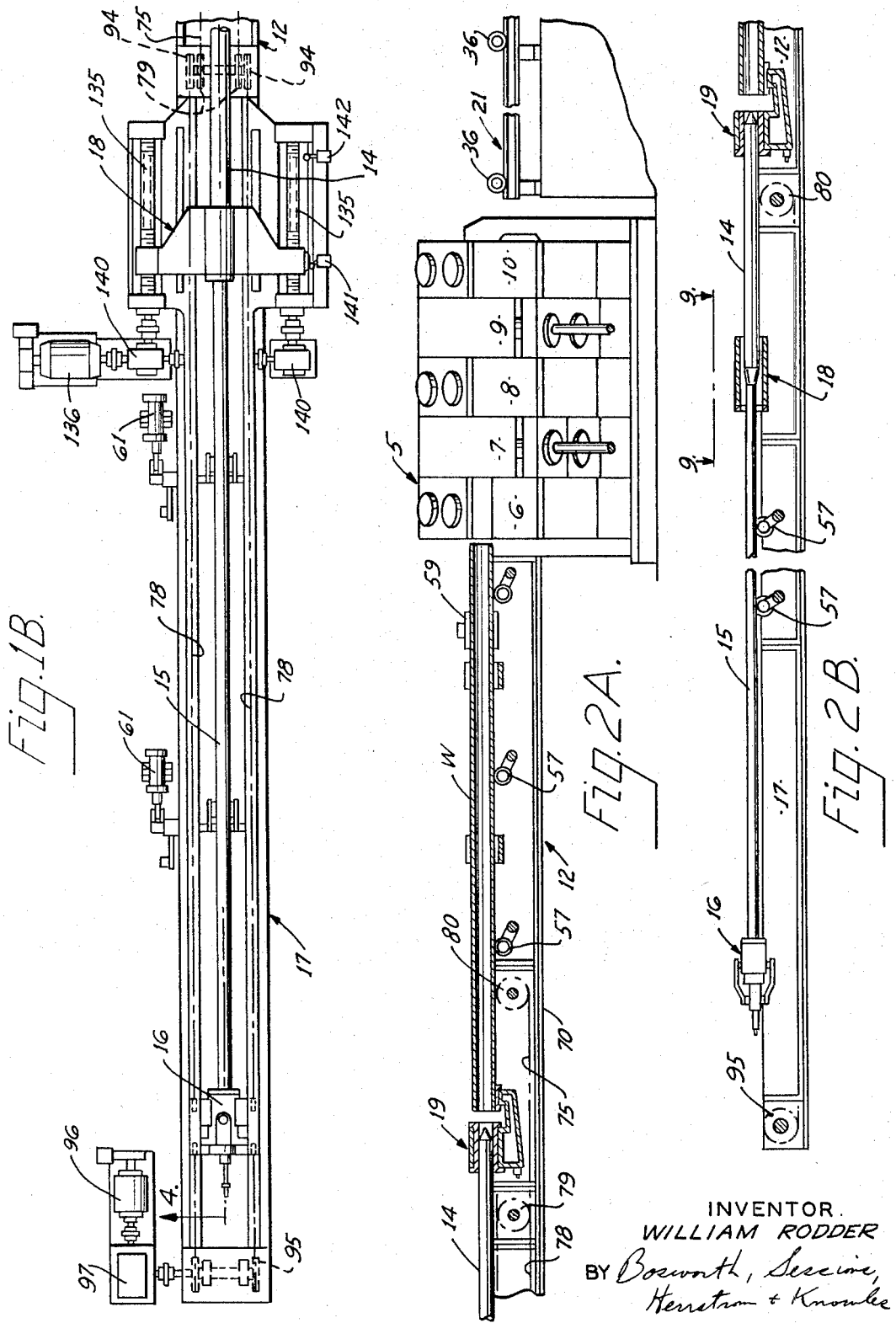

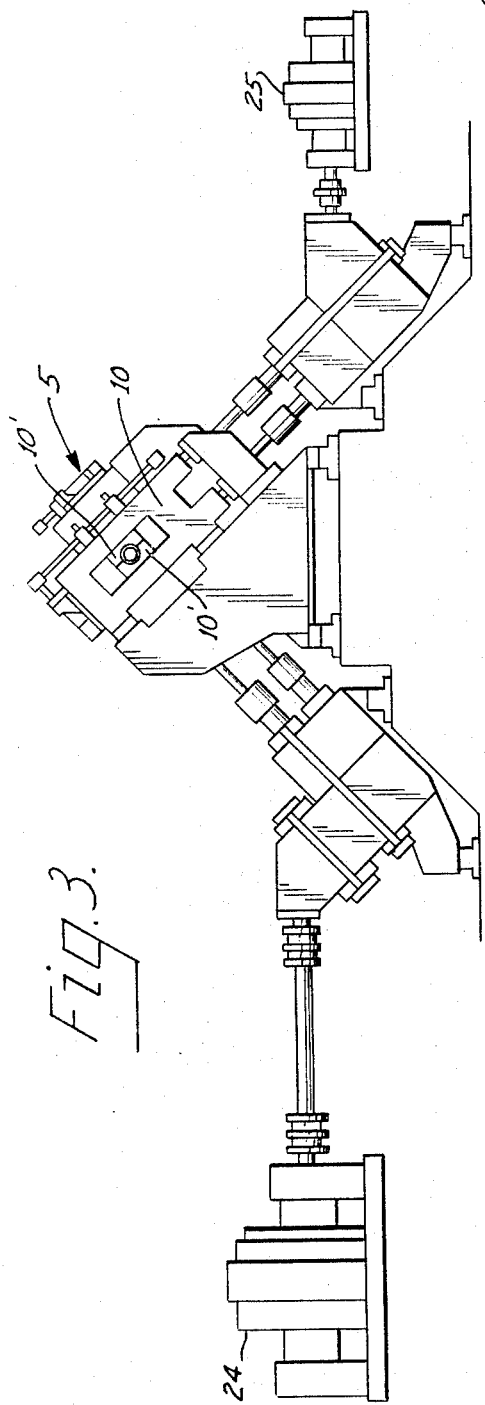
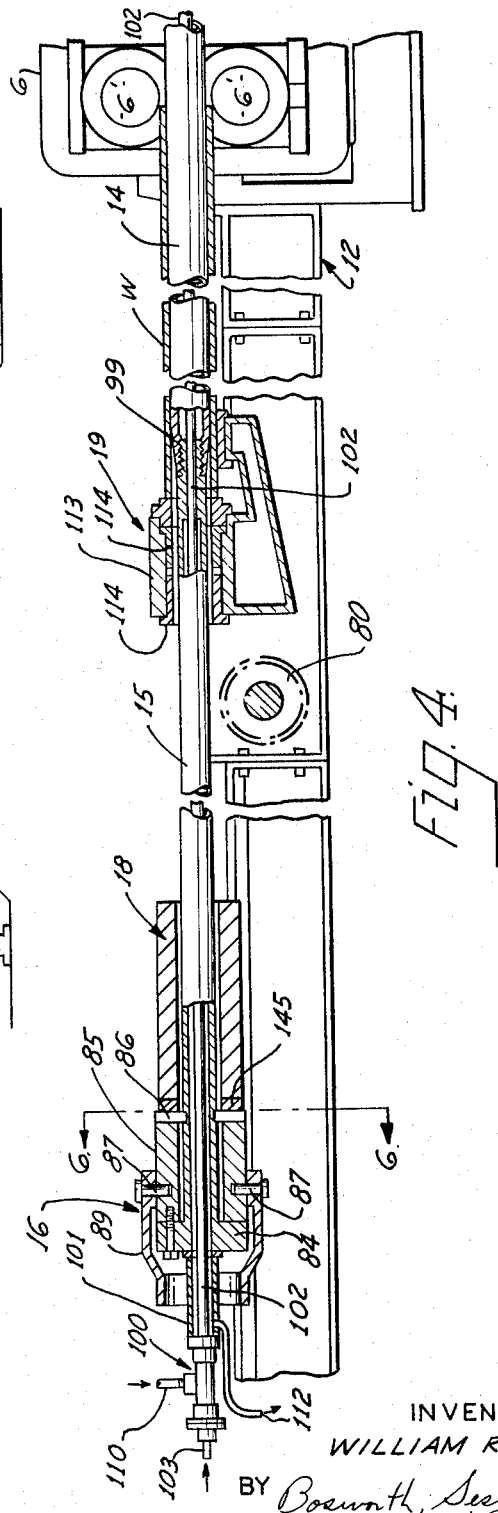

July 16, 1968  W. RODDER  3,392,565
MANUFACTURE OF SEAMLESS TUBING
Filed Feb. 15, 1965  9 Sheets-Sheet 4

INVENTOR.
WILLIAM RODDER
BY Bosworth, Sessions
Herrstrom & Knowles
ATTORNEYS.

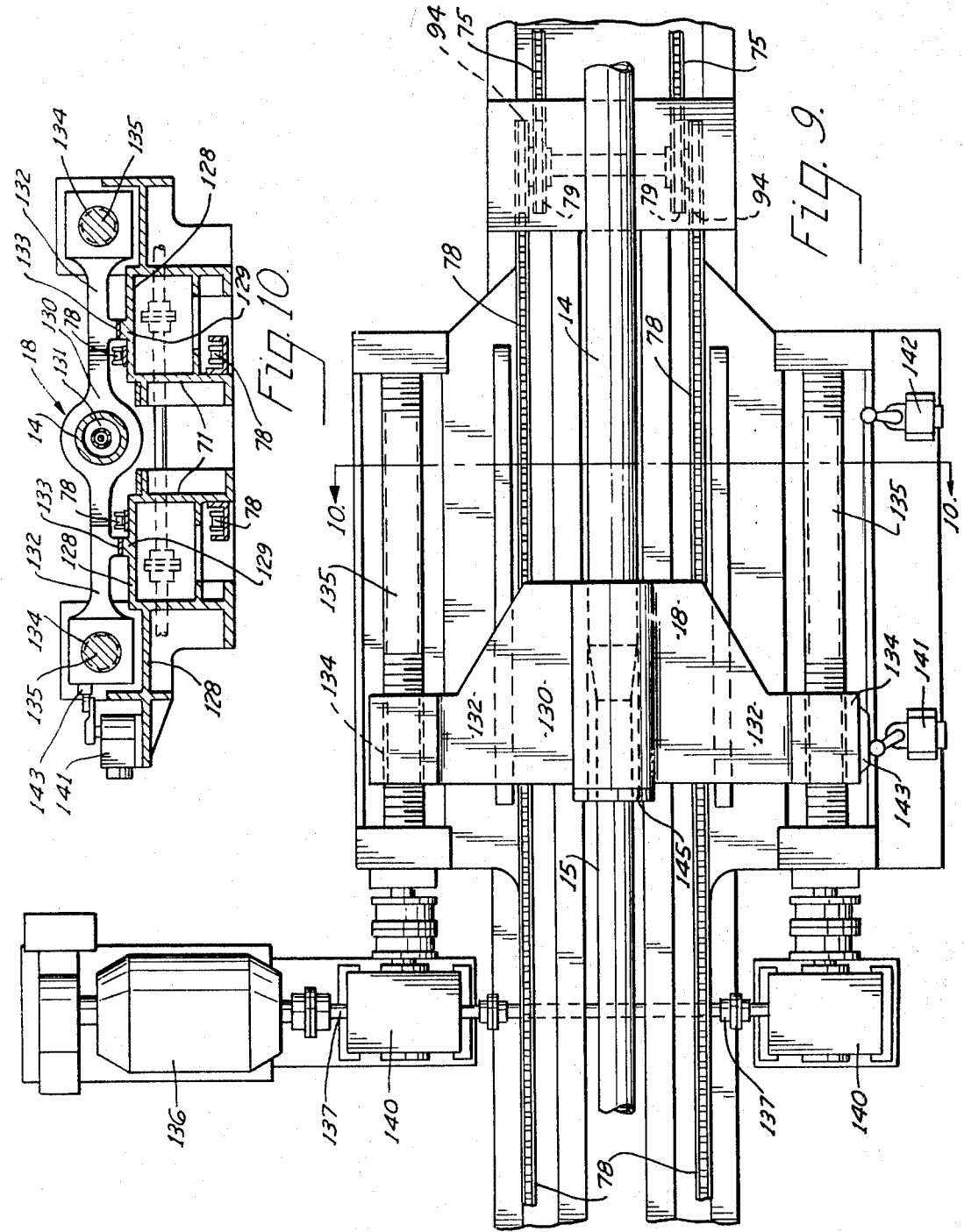

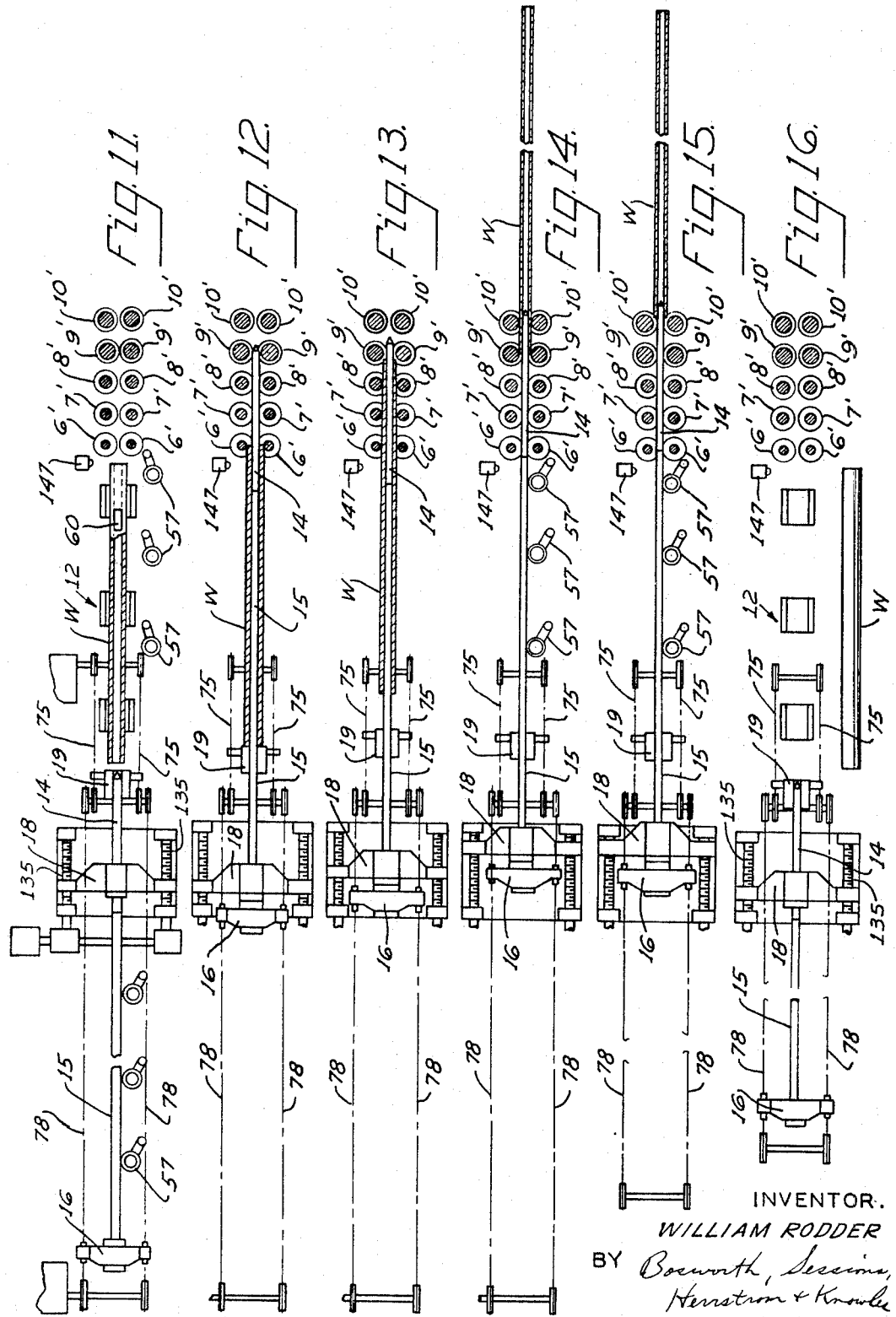

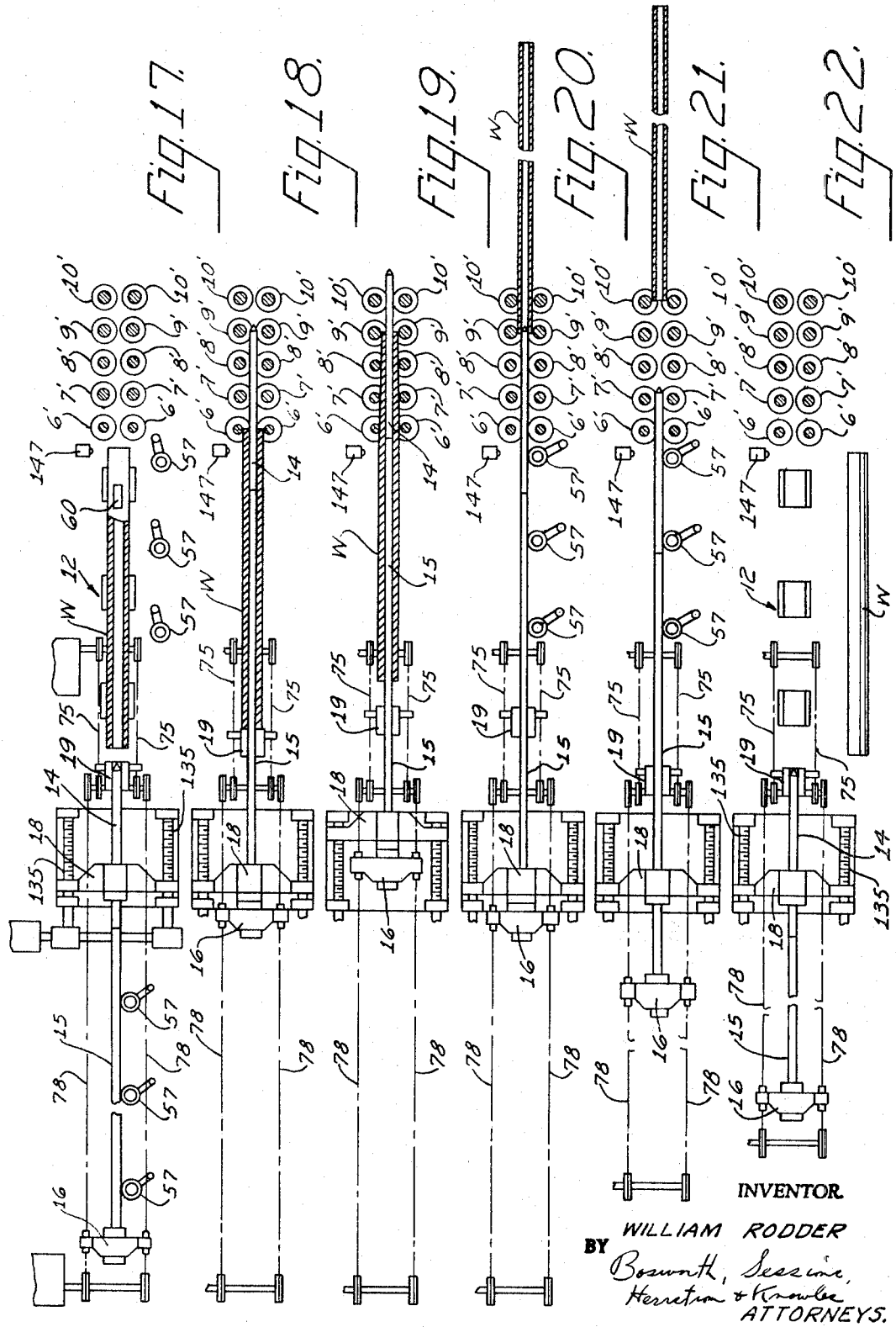

July 16, 1968 W. RODDER 3,392,565

MANUFACTURE OF SEAMLESS TUBING

Filed Feb. 15, 1965 9 Sheets-Sheet 9

INVENTOR.
WILLIAM RODDER
BY Bosworth, Sessions,
Herretron + Knowles
ATTORNEYS.

United States Patent Office 3,392,565
Patented July 16, 1968

3,392,565
MANUFACTURE OF SEAMLESS TUBING
William Rodder, Pittsburgh, Pa., assignor to Blaw-Knox
Company, Pittsburgh, Pa., a corporation of Delaware
Filed Feb. 15, 1965, Ser. No. 432,597
17 Claims. (Cl. 72—201)

ABSTRACT OF THE DISCLOSURE

A tube mill and a method of rolling tubes in which tubular blanks are supported by a mandrel as the blanks pass through a series of roll stands that have grooved rolls that reduce the wall thickness and greatly elongate the blank during its passage through the mill. The mandrel is short as compared to the original length of the blank and moves with respect to the mill at a slow speed compared to the speed of the blank during the rolling operation, its motion being controlled so that wear on the mandrel is distributed throughout a substantial area and so that the mandrel is disengaged from the blank at about the time the elongated blank is discharged from the mill.

---

This invention relates to the manufacture of seamless metal tubing and more particularly to an improved plug or mandrel mill and an improved method of rolling tubular blanks over a mandrel to reduce their wall thickness and diameter and greatly to elongate them.

The first step in the manufacture of seamless tubing is to pierce a billet to provide a tubular member, ordinarily referred to as a "shell," having a relatively heavy wall. The shell is then made into tubing of the desired diameter and wall thickness by subsequent operations in which the diameter and wall thickness of the shell are reduced and its length of the tube is greatly increased. For efficient operation of seamless mills, it is desirable to start with billets that are as large as possible and to carry out the piercing operation so as to produce shells with relatively heavy walls, since, for shells of a given weight, shells having thick walls are shorter than shells with walls of lesser thickness, the time required for the piercing operation is reduced and the risk of inside defects is also reduced. Shells with thick walls also maintain their temperature in subsequent rolling operations better than shells with thinner walls. The heavier the wall thickness, however, the greater the reduction in wall thickness that must be accomplished in order to convert the shells into tubing of commercial sizes. It has been customary to effect the first reduction of the shells in plug or mandrel mills. A conventional plug mill comprises a 2-high roll stand having grooved working rolls for rolling the tubing; a mandrel bar which supports a mandrel or plug in the pass of the working rolls; a pair of stripping rolls which are grooved to correspond to the working rolls for removing the tube from the mandrel; a receiving table embodying a trough for supporting a tube on the entering side of the rolls and a pusher for pushing the tube into the roll pass. In operation, a shell is deposited in the trough of the receiving table. The pusher shoves the shell into the pass of the working rolls and over the plug; the revolving working rolls then draw the shell rapidly over the plug reducing the diameter and wall thickness of the shell and elongating it. As soon as the shell has passed through the working rolls, the plug, which is quite short, is removed from the mandrel bar, the working rolls are separated and the stripping rolls are engaged with the tube to move the tube rapidly in the opposite direction off of the mandrel rod, through the space between the working rolls and into the trough of the receiving table.

The grooves in the working rolls of a conventional plug mill are not semi-circular but are flared or oval in order to prevent the edges of the grooves from damaging the shell as it passes through the work rolls. For this reason, the tube is slightly oval after its first pass through the mill and the wall thickness is not uniform; it is, therefore, necessary to rotate the tube 90° about its longitudinal axis and pass it through the plug mill again in order to make it approximately round and more nearly uniform in wall thickness. In conventional practice, therefore, after the tube has been subjected to the first pass through the mill, another plug is placed on the end of the mandrel bar and an operator grasps the tube with a pair of tongs and rotates it through approximately 90°. Then the pusher is actuated to push the tube into the roll pass again and the rolling and stripping cycle is repeated, leaving the elongated tube on the receiving table which, of course, is on the entry side of the mill. The tube is then discharged from the receiving table and progressed to further operations and another pierced shell is deposited on the receiving table and the cycle of operations of the mill repeated.

It is to be noted that in the conventional plug mill, the operation is necessarily rather slow and intermittent. Time is wasted when the tube is returned to the entry side of the mill by the stripper rolls. The necessity for turning the tube between passes not only takes additional time, but in most mills requires that an operator be stationed beween the working roll stand and the end of the receiving table in a location that is extremely hot and not without hazard. The plugs are subject to rapid wear and must be cooled between every pass so that a number of plugs are required. It is not possible to lubricate the plugs and for this reason, there is an inherent problem that tubes are rolled with inside scratches. Also, since the rolled tube is delivered on the entry side of the mill, unidirectional flow of material through the mill is not possible. Furthermore, it is customary to roll the tube only through a single set of grooves in the mill rolls; therefore, the amount of reduction in wall thickness and tube diameter that can be obtained is limited and the practicable elongation obtainable is about one and one-half to one and seven-tenths to one. The limited possible elongation of the tube and the fact that the plug supporting bar is under compression during the rolling cycle both limit the length of tube which can be rolled. Other inherent disadvantages of the conventional plug mill are substantial variations in wall thickness of the rolled tube and limitations in the minimum wall thickness which can be produced.

It has been proposed to construct mandrel mills embodying a plurality of roll stands and full-floating mandrels having lengths that must approach the length of the finished tube. Mills of this type are called full-floating mandrel mills; they consist of as many as nine roll stands, in which case the elongation may be as great as seven or eight to one. In full-floating mills, the mandrels, which are many feet long, pass through the mill with the work and are returned outside of the mill from the exit to the entry end of the mill. The long and heavy mandrels must be cooled between passes through the mill. Thus, the operation of such a mill requires, for example, for the rolling of one particular wall thickness, twelve to eighteen mandrels that are circulated through the mill, and expensive mechanisms to convey the mandrels from the exit end of the mill back to the entry end of the mill. Thus, a large mandrel inventory is required for the production of a range of tube wall thicknesses, and a shop for producing and conditioning mandrels is also needed. Because of the necessity for circulating the mandrels, these mills are not practical for use with large diameter or heavy walled shells. It would, for example, be impractical to circulate a mandrel having a length of, for example, 90 feet and a diameter of 12 to 14 inches.

A general object of the present invention, therefore, is the provision of a method and apparatus for rolling pierced shells in which many of the problems inherent in the construction and operation of conventional plug mills and full-floating mandrel mills are obviated. Other objects and advantages of the invention will become apparent from the following description of a preferred form thereof, reference being made to the accompanying drawings.

Briefly, I accomplish the foregoing objects of the invention by providing a plug mill embodying a plurality of roll stands, so that substantial reduction in wall thickness and diameter and consequent elongation of the work can be obtained, and using in combination with the roll stands an elongated internal plug or mandrel, the motion of which is controlled so that the madrel travels slowly through the successive roll stands, either in the same direction as the shell, but at a rate of speed much less than the speed of the shell, or in both the same and the opposite directions during the same rolling cycle. In either case, the length of the mandrel can be much less than the length of the elongated shell. The motion of the mandrel is controlled by a hollow mandrel rod to which the mandrel is secured and through which lubricant is injected to lubricate the internal surface of the tube and the external surface of the mandrel. The movement of the mandrel distributes the wear throughout a large part of the length of the mandrel, improves lubrication during the rolling operation and gives a better finish to the interior of the tube than can be obtained in conventional plug and floating mandrel mills. Also cooling fluid, such as water, is circulated through the mandrel rod to the mandrel, so that the mandrel is maintained at a reasonable temperature and can be used for long periods of time without replacement.

Referring to the drawings,

FIGURES 1A and 1B are somewhat diagrammatic plan views illustrating a preferred form of a mill embodying my invention.

FIGURES 2A and 2B are side elevational views of the mill shown in FIGURES 1A and 1B.

FIGURE 3 is an end elevation of the mill shown in FIGURE 1, the view being taken as indicated by line 3—3 on FIGURE 1A.

FIGURE 4 is a vertical sectional view, to an enlarged scale, taken generally as indicated by line 4—4 of FIGURES 1A and 1B but showing the parts in the position they take at the time that a tubular blank or shell is being introduced into the first stand of rolls in the mill.

FIGURE 9 is a plan view on an enlarged scale showing the apparatus for controlling the motion of the mandrel and taken generally as indicated by line 9—9 of FIGURE 2B.

FIGURE 10 is a transverse section taken as indicated by line 10—10 of FIGURE 9.

FIGURES 11, 12, 13, 14, 15 and 16 are diagrams illustrating successive steps in the rolling of a tubular blank on the apparatus with the mandrel traveling in the same direction as the shell.

FIGURES 17, 18, 19, 20, 21 and 22 are similar diagrams illustrating successive steps in the rolling of a tubular blank on the apparatus with the mandrel traveling first in the same direction as the shell and then in the opposite direction in a single rolling cycle.

Figure 1A:
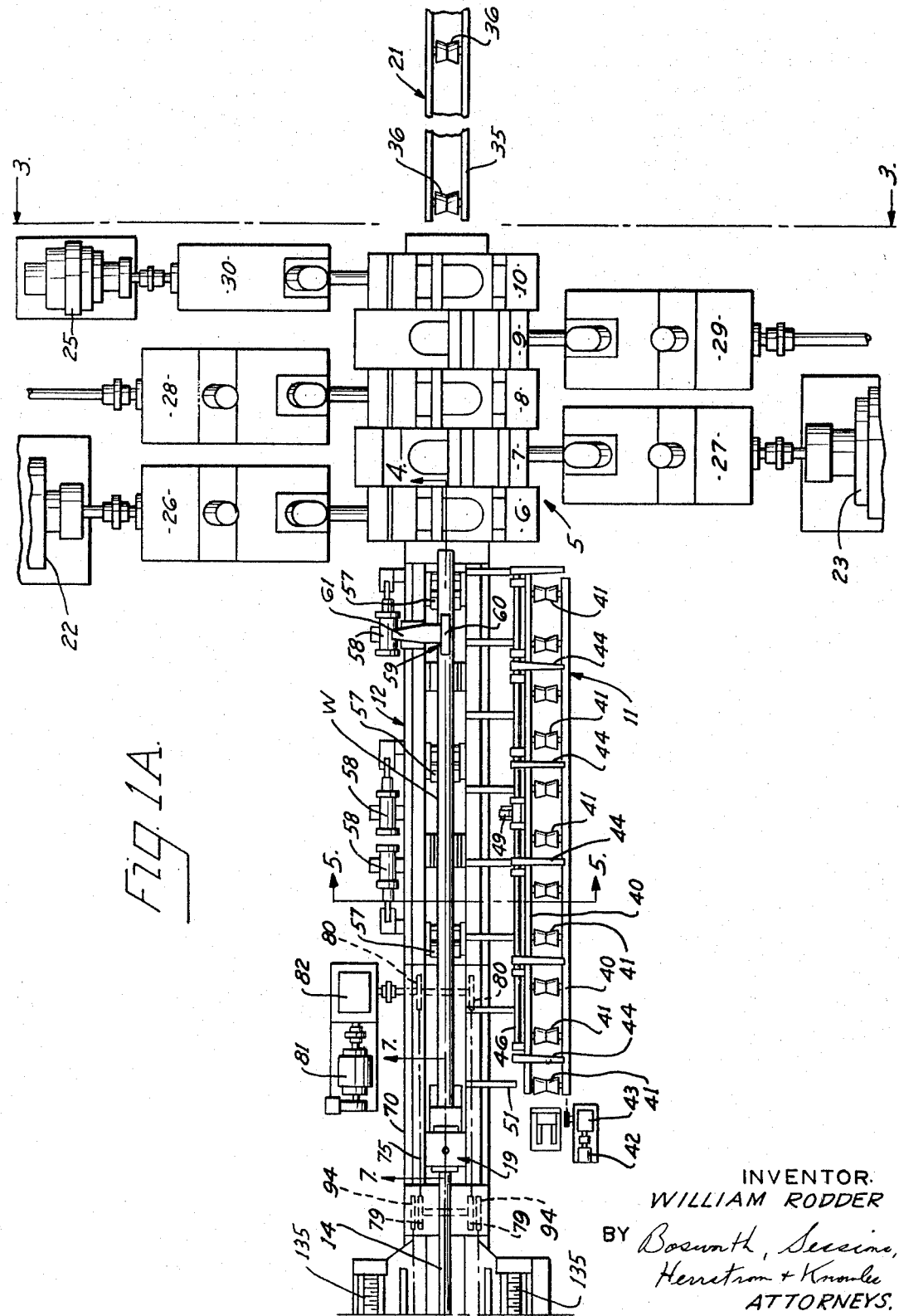

*General arrangement.*—As shown particularly in FIGURES 1A, 1B, 2A, 2B and 3, an apparatus made according to the present invention comprises a mill indicated in general at 5 and having roll stands 6, 7, 8, 9 and 10, in which the actual reduction and elongation of the workpieces takes place, a receiving table 11 on which the pierced shells to be worked on in the apparatus are deposited and an inlet table 12 to which the shells are transferred from the receiving table. A workpiece W in the form of a pierced billet or shell is shown in position on the inlet table in FIGURES 1A and 2A. The mandrel or elongated plug over which the tubular blanks are rolled is shown at 14. This is supported by a mandrel bar 15. The rear end of the mandrel bar is engaged and supported by a mandrel thrust block 16 that is slidably mounted for advancing and retracting the mandrel on a table extension 17. The mandrel 14 is arranged to be advanced and retracted by the mandrel thrust block and mandrel bar between an advanced position in which the forward end of the mandrel projects a substantial distance into the mill, for example, into the pass of the fourth roll stand 9, and a retracted position in which the forward end of the mandrel is retracted far enough to permit the inlet table to receive a shell to be rolled. The mandrel is shown in its retracted position in FIGURES 1B and 2B.

During the actual rolling operation, the mandrel thrust block 16 engages a mandrel movement control beam 18 that is slidably mounted on the table extension 17 and the motion of the mandrel within the mill is controlled by this beam. The inlet table 12 slidably supports a tube pusher and mandrel guide 19 which is utilized to engage the rear end of a shell that is on the inlet table and push the front end into the first roll stand 6 of the mill 5. Thereafter, the tube is drawn through the mill by the action of the rolls and the friction of the tube on the mandrel 14 tends to draw the mandrel, mandrel bar and associated mechanisms along with the tube. This motion, however, is resisted by the mandrel movement control beam 18. The motion of the beam 18 is controlled by a mechanism described below so that the mandrel 14 is either allowed to advance the distance that is required to enable the plug to support the tube in its passage through the mill, or, in the other mode of operation, is retracted against the force exerted on it by the tube. After passing through the mill, the workpiece, which has been much elongated, is discharged onto an outlet table 21, only a portion of which is shown in the drawings.

Figure 28:
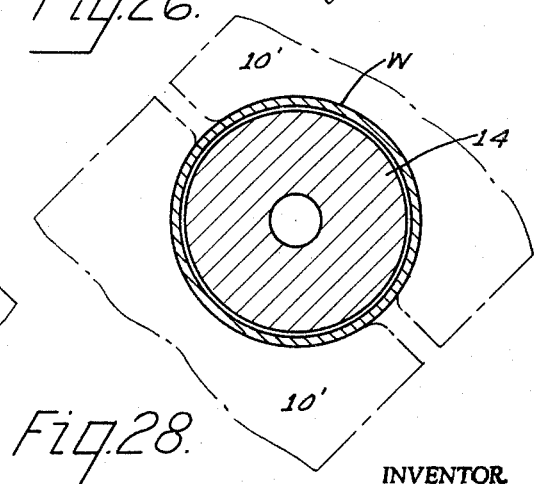

*The mill.*—The mill proper is shown as being made up of five independently driven roll stands 6, 7, 8, 9 and 10. A greater or lesser number of roll stands may be employed depending upon the duty for which the machine is designed. In the present apparatus, the roll stands themselves may be of fairly conventional construction, each embodying a pair of rolls 6', 7', 8', 9' and 10', respectively. The rolls are grooved as shown in FIGURE 4 and in FIGURES 11 to 22, inclusive. In these figures, for convenience of illustration, the rolls are shown in elevation and as being disposed on horizontal axes; however, as shown in FIGURES 1A, 2A and 3, the axes of the rolls are preferably at angles of 45° to the horizontal and the axes of the rolls in alternate stands are disposed at 90° to each other. This is usual practice in tube rolling mills of various types such as conventional mandrel and stretch reducing mills. If more than two rolls are employed in the roll stands, the angle of the axes of the rolls may vary from the above depending on the number of rolls per stand, as in conventional practice. As is customary in rolls for plug mills, the roll grooves are slightly oval in cross-section to prevent the edges of the grooves from damaging the shell as it passes through the rolls. The cross-section of the work as it passes through the mill and the shape of the successive roll passes are illustrated in FIG- URES 23 to 28. As illustrated in these figures and as described below in connection with operation of the mill, the work is reduced in all of the roll stands except the last which simply rounds up the tube and frees it from the internal mandrel or plug 14 as shown in FIGURE 28.

The rolls preferably are driven by individual motors 22 and 23 for roll stands 6 and 7, respectively, and 24 and 25 for roll stands 9 and 10 (see FIGURES 1A and 3). A motor similar to motors 22, 23 and 24 is used to drive roll stand 8. This motor is not illustrated in the drawings. The motors drive the rolls through appropriate couplings and reduction and angle gear boxes 26, 27, 28, 29 and 30 for the roll stands 6 to 10, respectively. It will be noted that the motor 25 and the gear box 30 are smaller than the remaining motors and gear boxes; the reason for this is that the final roll stand requires less power since it simply rounds out the tube and does not effect any substantial reduction. The speed of the motors is individually controlled in a known manner. The peripheral speed of the rolls must progressively increase from roll stand 6 through roll stand 10 because of the progressive elongation of the work as it passes through the mill; as in any continuous rolling process, the product of cross-sectional area of tube and tube velocity must have the same value in each roll stand.

As noted above, the rolled workpiece is discharged by the mill onto the outlet table 21. This is conventional and comprises an appropriate supporting frame 35 and a series of rolls 36. Conventional kickout devices may be provided if desired to transfer the rolled blank to a subsequent operation. The table should be long enough to accept the longest tube that can be produced by the mill.

Figure 5:
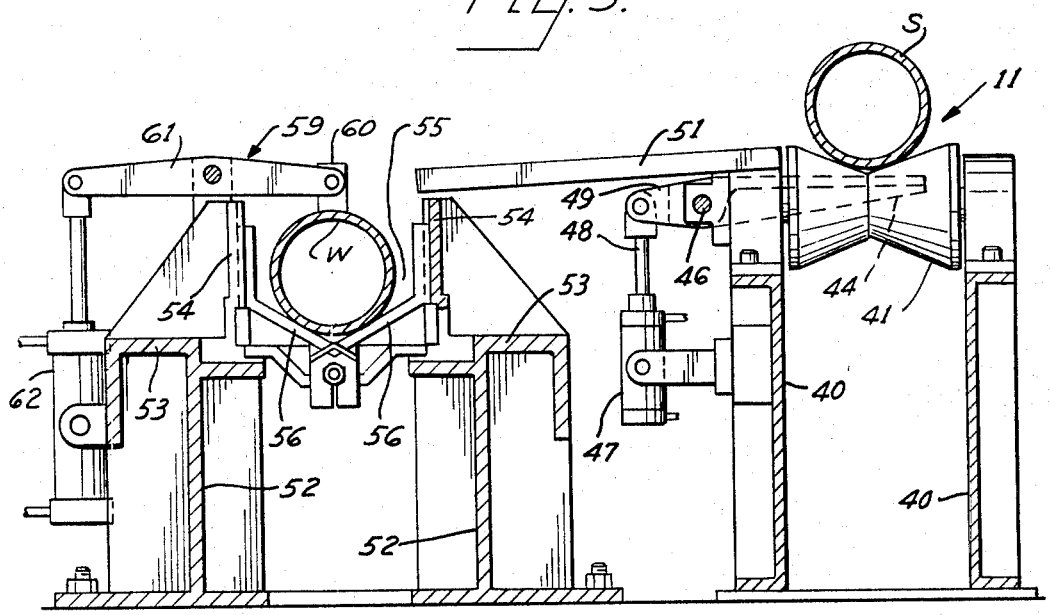
FIGURE 5 is a transverse section through the receiving table of the apparatus, the section being taken as indicated by line 5—5 on FIGURE 1A.

*Receiving and inlet tables.*—Except for the mandrel control and the tube pushing mechanisms, which are described in greater detail below, the receiving and inlet tables are of simple and more or less conventional construction. The receiving table 11, as shown in FIGURES 1A and 5, is made up of a supporting frame fabricated from longitudinally extending beams 40 which support rolls 41 in appropriate bearings. The rolls 41 are adapted to be driven in either direction by a motor 42 and conventional gearing 43 so that a tube deposited on the table 11 can be positioned in the desired location with its forward end near the first roll stand 6.

In order to transfer workpieces W from the receiving table 11 to the inlet tube 12, a series of kickout arms 44 are provided. Arms 44 are mounted on a longitudinally extending shaft 46 that is arranged to be rotated by a hydraulic cylinder and piston assembly 47, the connecting rod 48 of which is connected pivotably to a lever 49 fixed to the shaft 46. Actuation of the cylinder and piston assembly 47 to draw the connecting rod into the cylinder raises the arms 44. The arms lift the workpiece W off the rolls 41 whereupon it rolls along the bars 51 that bridge the gap between the receiving table and the inlet table 12 and falls onto the inlet table.

The inlet table 12 is made up of longitudinally extending frame members 52, the upper flanges 53 of which support upwardly extending vertical flanges 54 that define a trough 55 in which the workpieces W are deposited, the bottom of the trough being provided by V-shaped members 56. These members are adjustable vertically in order to align the center line of workpieces of different diameters with the pass line of the mill. In order to support the mandrel plug 14 when there is no workpiece on the inlet table 12, the table is provided with a series of disappearing rollers 57 (see FIGURES 1A and 2A) that are adapted to be raised and lowered by hydraulic cylinders 58 and appropriate linkage between a lower position in which they clear the workpiece W and a raised position in which they support the mandrel bar 15.

The inlet table is also provided with a work clamp 59 comprising a work engaging shoe 60 which is supported by an arm 61 and actuated by a cylinder 62, again through appropriate linkage. In clamping position, as shown in FIGURE 5, the shoe 60 engages the upper surface of the workpiece and holds it securely in the trough 55 against longitudinal movement. The clamp is used to hold the workpiece in position after it has been deposited in the trough 55 and during the time that the mandrel 14 is being inserted within the workpiece. The clamp is released before the actual rolling operation begins.

The rear portion 70 of the inlet table 12 is modified as shown particularly in FIGURES 1A, 2A, 7 and 8 to provide a support for the tube pusher and mandrel guide 19. In this portion of the table, the longitudinal frame members 71 are fabricated to provide slideways 72 for supporting the tube pusher, and upper and lower guides 73 and 74 for supporting the chains 75 that actuate the tube pusher. The frame members also support upper and lower guides 76 and 77 for the chains 78 that are employed to rapidly advance and retract the mandrel. The tube pusher 19 and its associated mechanisms, as well as the mandrel and mandrel operating mechanisms are described below. The chains 75 that advance and retract the pusher are carried on sprockets 79 and 80 that are mounted on shafts suitably journaled in the frame members 71. The sprockets 79 are driven by a reversible motor 81 through gearing 82, suitable controls being provided so that the operator can advance and retract the tube pusher 19 as needed. The chains are partially enclosed by guards 83.

Figure 6:
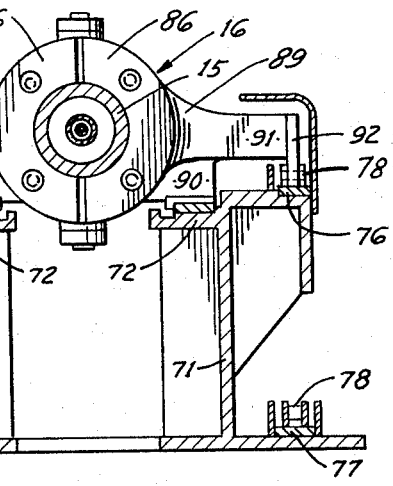
FIGURE 6 is a vertical section taken as indicated by line 6—6 of FIGURE 4.

*The mandrel and associated mechanisms.*—The mandrel or plug 14, as noted above, is positioned by the elongated mandrel bar 15, the rear end of which is carried by the mandrel thrust block 16. In order to make possible the rapid movement of the mandrel in both the advancing and retracting directions, the table extension 17 is constructed generally similarly to the rear portion 70 of the inlet table 12, the frame members 71, slideways 72 and guides 73, 74, 76 and 77 being continued throughout the length of the table extension. The mandrel thrust block 16 is mounted on the slideways 72, as shown particularly in FIGURE 6.

As shown particularly in FIGURES 2B and 4, the mandrel bar 15 is a tubular member that is secured at its rear end to the mandrel thrust block 16 and at its forward end to the plug or mandrel proper 14 which is of larger diameter than the hollow mandrel bar. It is to be noted that the rolling forces exerted by the operation of the mill tend to draw the plug 14 through the mill. Since the rear end of the mandrel bar 15 is secured to the thrust block 16, the substantial forces exerted by the mandrel during rolling subject the mandrel bar only to stresses in tension. Thus, the mandrel bar is not subjected to bending or buckling forces during the rolling operation.

In order to transmit these tension forces from the mandrel bar 15 to the mandrel thrust block 16, the end of the tubular mandrel bar is provided with a massive flange 84 that is secured to a cylindrical body member 85 of the thrust block (see FIGURE 4). A split flange 86 additionally secures the tubular mandrel bar 15 to the block 16, the two halves of the flange being received in a groove on the outer surface of the bar as shown in FIGURE 4.

The cylindrical member 85 is supported by vertical trunnions 87 that are carried by an outer body member 89 that has projecting slide members 90 and horizontal wings 91 to which depending flanges 92 are secured. The slides 90 are supported on the slideways 72 of the table extension 17 and the flanges 92 are secured to the chains 78. The upper reaches of chains 78 are supported in the guideways 76 while the lower reaches of the chains 78 are supported in the guideways 77. The chains 78 pass over idler sprockets 94 that are carried on the same shaft as the idler sprockets 79 for the chains 75. The chains 78 are driven by sprockets 95 at the rear end of the table extension 17 (see FIGURE 1B). The sprockets 95 are driven by a reversible motor 96 through suitable gearing and shafting 97. By means of appropriate controls, the motor can be operated to advance or retract the mandrel rapidly and also to move it slowly into operative position with the mandrel thrust block 16 in engagement with the mandrel movement control beam 18 as shown in FIGURE 4.

Since the mandrel bar 15 is quite long in comparison with its diameter, it is supported against vertical deflection because of its weight by additional disappearing rollers 57 disposed at required intervals along the table extension 17. These are like the disappearing rollers 57 previously described and are moved by hydraulic cylinders 58 and appropriate linkages. The cylinders 58 are controlled by conventional limit switches and valves so that each roller 57 is moved downwardly out of the way of the thrust block 16 as the thrust block approaches it during movement of the block in the advancing direction toward the mill and each roller is raised to position to support the mandrel bar 15 after the thrust block 16 has passed it upon movement of the thrust block in the retracting direction.

Figure 7:
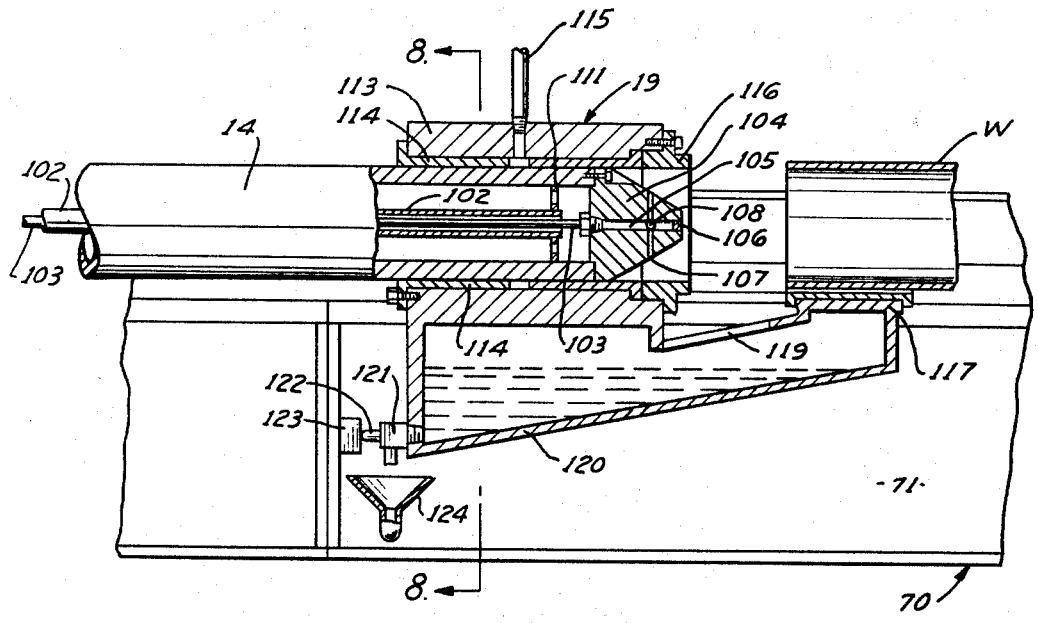
FIGURE 7 is a transverse section taken as indicated by line 7—7 of FIGURE 1.

As shown in FIGURES 4 and 7, the mandrel or plug 14 is also hollow and takes the form of an appropriate length of heavy walled tubing composed of a wear and heat resistant metal. The mandrel 14 is secured to the mandrel bar 15 by a strong threaded connection as shown at 99. The hollow construction of the mandrel and mandrel bar makes it possible not only to lubricate the interior of the workpieces before the rolling operation takes place but also to cool the mandrel. This is accomplished by providing a fitting 100 at the rear end of the thrust block 16. Fitting 100 is secured to a cylindrical extension 101 that is mounted on the flange 84 and which has an opening that is concentric with the opening in the center of the mandrel bar 15. Fitting 100 is also connected to a pipe 102 that extends throughout the length of the mandrel bar from the fitting 100 to a point near the forward end of the mandrel as shown in FIGURE 7. A smaller tube or pipe 103 extends with the pipe 102 from the rear end of the fitting 100 to the nosepiece 104 of the mandrel 14. Nosepiece 104 is drilled to provide a passageway 105 communicating with the interior of pipe 103. The outer end of passageway 105 is plugged as at 106 and the nosepiece is cross-drilled as at 107 and 108 to provide radially extending passageways in communication with the pipe 103. Lubricant is supplied to the pipe 103 under pressure and is sprayed outwardly through the passageways 107 and 108 onto the inner surface of a workpiece disposed on the inlet table during the time that the mandrel is being advanced from its retracted position to its advanced position preparatory to rolling a shell.

In order to cool the mandrel, water under pressure is admitted to the fitting 100 through a conduit 110 which is connected to the interior of pipe 102. Water then flows through the pipe 102 and around the lubricant carrying tube 103 to the end of pipe 102, the end of the tube being supported by a perforated spider 111 that is supported by the inner walls of the mandrel and disposed near the nosepiece 104. Additional spiders (not shown) may be utilized to center the pipe 102 with respect to the mandrel 14 and the mandrel bar 15. Water admitted through the pipe 102 flows rearwardly around the pipe 102 and within the hollow mandrel 14, effectively cooling it. The water flows back to the rear end of the mandrel bar 15 and through a discharge opening in the cylindrical extension 101 into a long, flexible drainage conduit 112. Long, flexible conduits are also employed to supply lubricant to the interior of tube 103 and cooling water to the conduit 110 to permit the required movement of the mandrel bar 15 and the thrust block 16.

Figure 8:
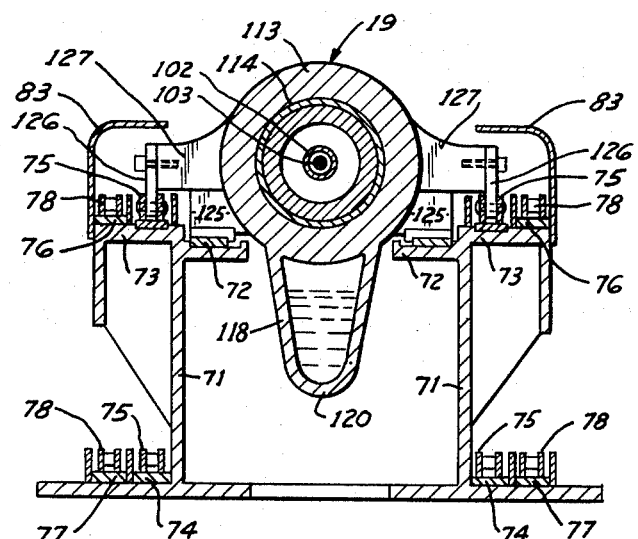
FIGURE 8 is a transverse section taken as indicated by line 8—8 of FIGURE 7.

In order to support the mandrel 14 and guide it properly into a workpiece deposited on the inlet table, the tube pusher 19 also functions as a guide for the mandrel. As shown in FIGURES 4, 7 and 8, the tube pusher embodies a cylindrical portion 113 having a two-piece bushing 114 through which the mandrel 14 extends. Lubricant for the exterior of the mandrel is supplied through a conduit 115. In its retracted position, the nosepiece 104 of the mandrel is disposed just within the front thrust member 116 that is secured to the cylindrical portion 113 and which functions to engage the workpiece and push it into the bite of the first roll stand as will appear more fully below. Before the workpiece is pushed into the roll stand, however, the mandrel is first pushed through the workpiece. At this time the rear end of the workpiece is supported on a forwardly projecting rest portion 117 of the tube pusher.

In order to collect excess lubricant that may be sprayed out of the cross-drilled openings 107 and 108 of the nosepiece, the tube pusher is provided with a hollow base 118 that acts as a reservoir for lubricant. Lubricant sprayed from the nosepiece 104 and running out of the workpiece can run into the reservoir through an opening 119 in the upper wall of the reservoir. The reservoir bottom 120 slopes downwardly as shown to a drain valve 121 at the lower and rear end of the reservoir. This valve is automatically opened when the plunger 122 thereof is in engagement with a block 123 secured to the inlet table and automatically closed when the tube pusher is moved forwardly so that the plunger is disengaged from the block 123. Drainage from the valve 121 is caught in a funnel 124 and carried to a lubricant sump, to be recirculated as required.

The tube pusher, as previously pointed out, is mounted for sliding movement on the slideways 72. The pusher is supported by slides 125 extending outwardly from the cylindrical portion 113 and is arranged to be moved back and forth, as previously mentioned, by the chain 75 that engages depending flanges 126 that are carried by wings 127 extending from the cylindrical portion 113.

*Mandrel movement control.*—As noted above, the movement of the mandrel during the time that the rolling operation takes place is controlled by the mandrel movement control beam 18. This is shown at the right hand end of FIGURE 1B and a little to the rear of the tube pusher 19 in FIGURE 2B. The beam itself is illustrated to a larger scale along with its control mechanisms in FIGURES 9 and 10.

As shown in FIGURE 10, the rear portion of the inlet table is increased in width and provided with additional laterally extending frame members 128 for supporting the beam and its associated mechanisms. Frame members 128 are provided with slideways 129 on which the beam is supported. The beam comprises a main body member 130 having a central opening 131 through which the mandrel bar 15 extends and having laterally extending portions 132 through which the beam is supported and moved. The beam is supported by slides 133 that engage the slideways 129.

In order to control the motion of the beam and the mandrel, and to resist the rather substantial forces imposed upon the beam by the mandrel during a rolling operation, the ends of the laterally extending portions 132 are preferably internally threaded as at 134 and constitute, in effect, nuts mounted on screws 135. By rotating the screws, the movement of the beam can be controlled. When the screws remain stationary, the beam is locked in position. The screws 135 are driven by a reversible motor 136 which drives a cross shaft 137 disposed below the level of the beam 18 and which, through suitable bevel, gearing, vertical shafts and upper beveled gearing 140 drives the screws 135. Limit switches 141 and 142 that engage a cam surface on one of the laterally extending portions 132 are provided to stop the movement of the beam at the limits of its advancing and retracting movement. The speed and direction of movement of the beam are controlled so that the mandrel 14 is either permitted to advance through the mill along with the workpiece, or is retracted against the motion of the workpiece at the speed required to move the mandrel the necessary distance during the time that the workpiece is being progressed through the mill. As previously noted, this movement, in either direction, is of much less extent than the length of the workpiece or the amount of movement of the workpiece. During the time that a workpiece is being rolled in the mill, the face of the flange 86 of the mandrel thrust block 16 is in engagement with the rear face 145 of the beam as shown in FIGURE 4.

*Operation.*—A complete sequence of operations with the mandrel traveling in the same direction as the work during the rolling operation is shown diagrammatically in FIGURES 11 to 16 of the drawings. While these figures indicate most of the elements of the machine in plan, some parts, such as the roll stands and the disappearing idler rolls 57 are shown in elevation for convenience in illustration. In FIGURE 11, a workpiece W in the form of a pierced billet has been deposited on the inlet table 12. The mandrel thrust block 16 has been retracted so that the forward end of the mandrel 14 is disposed in the guide portion of the tube pusher 19. The mandrel bar is supported by disappearing idler rollers 57. The mandrel movement control beam 18 is at or near its rearward limit of movement. The tube clamping shoe 60 is in engagement with the upper surface of the workpiece W holding it against the bottom of the supporting trough of the inlet table and thus holding it against longitudinal movement. All of the roll stands making up the mill are running at their predetermined speeds. Cooling water is being supplied to the interior of the mandrel through the pipe 102.

The first step in the operation is rapidly to advance the mandrel thrust block 16, the mandrel bar 15 and the mandrel 14, by means of the chains 78, from the positions shown in FIGURE 11 almost to the positions shown in FIGURE 12 where the mandrel thrust block 16 is in engagement with the mandrel movement control beam 18 and the mandrel has been advanced through the tube to a position such that its point is advanced a substantial distance through the mill; for example, into the pass of the next to last roll stand 9 as shown in FIGURE 12. During this operation, the lubricant pump is operated to spray lubricant through the nose of the mandrel to lubricate the interior of the tube and the exterior of the mandrel, the lubricant being turned off by a limit switch when the nose of the mandrel approaches the forward end of the workpiece W. This or a similar limit switch stops the high speed advance of the mandrel thrust block before it touches the movement control beam. Then the thrust block is automatically advanced slowly into engagement with the movement control beam and stopped in the position shown in FIGURE 12.

After the mandrel has been advanced to the position shown in FIGURE 12 with the mandrel thrust block in engagement with the movement control beam, the tube clamping shoe 60 is released and the tube pusher 19 is advanced, preferably at a speed slightly less than the speed of the first roll stand, by means of the chains 75, which are driven by the motor 81, until the forward end of the workpiece is in the bite of the rolls 6' of the first roll stand. At this time, the pusher is automatically reversed by a limit switch and returned to its initial position and stopped. At the time that the forward end of the hot workpiece approaches the bite of the rolls 6', a heat sensing device, indicated diagrammatically at 147 in FIGURE 11, positioned adjacent rolls 6' starts the motor 136 to drive the screws 135 to advance the movement control beam 18 in the forward direction at the desired rate of speed. These screws control the rate of speed of advance of the mandrel 14 which moves forward, but at a much slower rate than the tube. Thus, at the time that the workpiece is pushed into the bite of the first roll stand, the mandrel is moving in the same direction as the workpiece. This facilitates the entry of the work into the mill. The rolls 6' then grasp the workpiece and start it rapidly on its way through the mill. The rolling action exerts a strong force on the mandrel 14 tending to urge it forwardly through the mill along with the workpiece. This motion is prevented by the mandrel bar 15 which is restrained from movement by the mandrel thrust block 16 that is in engagement with the rear of the movement control beam 18.

As shown in FIGURE 14, the forward end of the mandrel 14 has passed through the last set of rolls 10' while the trailing end of the mandrel is still within the bite of the rolls 6' of the first roll stand 6. Thus, the working surface of the mandrel 14 is always present to support the interior of the workpiece against the forces exerted upon it by the mill. However, it will be noted that the mandrel has moved only a comparatively short distance (in the example given, the distance from the pass of the roll stand 9 to a point just beyond the final roll stand 10) during the time that the entire tubular blank has passed through all of the rolls and has become greatly elongated during its passage. The rate of speed of the mandrel preferably is controlled so that the mandrel is in motion during the passage of the work through all but the last roll stand. Movement of the mandrel while the trailing end of the work passes through the last roll stand is not harmful, but is not ordinarily required, because the work usually is not reduced or elongated in the last roll stand; instead it is merely rounded up and at least partially freed from the mandrel. The motion of the mandrel distributes the wear on the mandrel and insures that the surface of the mandrel where the work is being done will be lubricated. It will be noted that although the mandrel moves only a comparatively short distance during the rolling operation, the wear on the mandrel is distributed throughout the major portion of the length of the mandrel and wear in concentrated areas of the mandrel is greatly reduced if not eliminated.

FIGURE 15 shows the next and final stage of the rolling operation in which the trailing end of the workpiece has just been discharged from the last roll stand 10, the workpiece then going onto the outlet table. The final step in the cycle is to retract the mandrel by means of the chains 78 rapidly to return the mandrel to starting position. In the meantime, the tube pusher and the mandrel movement control beam have been moved back to their initial positions. The apparatus is then ready to receive a new workpiece which has been deposited on the receiving and positioning table 11 during the rolling of the preceding workpiece. The new workpiece is rolled onto the inlet table and clamped in position ready for a new cycle of operations as soon as the mandrel mechanism and associated parts have been restored to their initial positions as shown in FIGURE 11.

FIGURES 17 to 22, which are diagrams similar to FIGURES 11 to 16, show a sequence of operations with the mandrel traveling first in the same direction as the work and then in the opposite direction during the rolling operation. In FIGURE 17, a pierced billet W has been deposited on the inlet table 12, the various elements of the apparatus are in substantially the same positions as in FIGURE 11, and as before, all of the roll stands making up the mill are running at their predetermined speeds.

The first step is, as before, the advance of the mandrel thrust block 16, the mandrel bar 15 and the mandrel 14 by means of the chains 78 from the positions of these parts shown in FIGURE 17 to the positions shown in FIGURE 18, where the parts are in the same positions as in FIGURE 12. As before, the flow of cooling water is continued throughout the entire operation. Also, the flow of lubricant is controlled as previously described.

Next, the workpiece is advanced into the mill by the pusher 19, the sequence of operations being as previously described. As before, at the time that the forward end of the hot workpiece approaches the bite of the rolls 6', the heat sensing device 147 starts the motor 136 to drive the screws 135 to advance the mandrel; the advancing movement of the mandrel assisting in the entry of the workpiece into the rolls. In this mode of operation, however, the control beam 18 is advanced more rapidly than before, which assists in the entry of the work into the mill, and the mandrel reaches the forward limit of its travel at about the time that the forward end of the work reaches the next-to-last roll stand 9. In this position, as shown in FIGURE 19, the forward end of the mandrel is beyond the last roll stand 10 while the rear end of the mandrel has not reached the first roll stand.

When this stage is reached, the motor 136 is reversed by an appropriate control and the screws 135 are driven to retract the mandrel in the direction opposite to the direction of movement of the workpiece. This motion, which is against the force exerted by the work on the mandrel during the rolling operation, is continued until the mandrel is returned to the position shown in FIGURE 20, which is the same position shown in FIGURE 18. In FIGURE 20, the trailing end of the workpiece has just passed through the next-to-last roll stand 9'; the movement of the mandrel is timed with respect to the movement of the work so that the mandrel does not leave the pass of rolls 9' until the work has been discharged from these rolls, thus insuring proper support of the interior of the workpiece during its entire passage through rolls 9'. The work is entirely free of the mandrel, as shown in FIGURE 21, at the time that the trailing end of the workpiece is leaving the rounding-up rolls 10'. With this mode of operation, the workpiece is stripped from the mandrel without difficulty and without requiring any separate stripping mechanism. This is a feature that can be of importance in certain types of rolling operations, particularly when large and heavy pierced billets or shells are involved.

After the workpiece has passed beyond the mandrel, the chains 78 are operated to return the mandrel rapidly to the starting position, the mandrel being shown in an intermediate position in its return movement in FIGURE 21. In the meantime, the tube pusher has been retracted to its initial position and finally the elements are returned to the same positions they occupied in FIGURE 17. The apparatus is then ready to receive a new workpiece which has been deposited on the receiving and positioning table 11 during the rolling of the preceding workpiece. As before, the new workpiece is rolled onto the inlet table and clamped in position ready for a new cycle of operations.

It is to be noted that in the mode of operation diagrammatically illustrated in FIGURES 17 to 22, as in the previously described mode of operation, the mandrel is kept in motion during the rolling operation and the wear on the mandrel is distributed throughout a substantial portion of the length of the mandrel.

Figure 23:
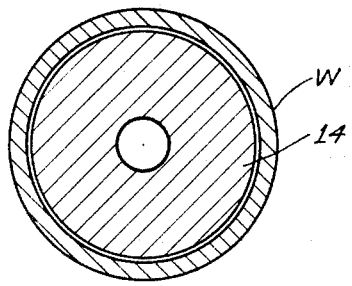
FIGURE 23 is a cross-section, to a greatly enlarged scale, showing the work and the mandrel as the work enters the mill.
Figure 24:
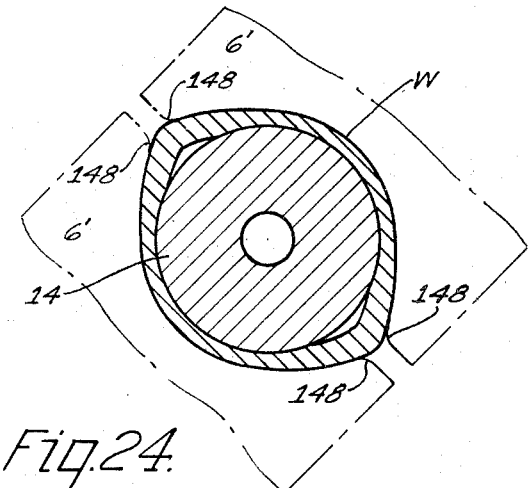
FIGURES 24, 25, 26, 27 and 28 are cross-sections similar to FIGURE 23, to the same scale, and showing the work as it passes through the successive roll stands of the mill, the rolls being indicated in broken lines.
Figure 25:
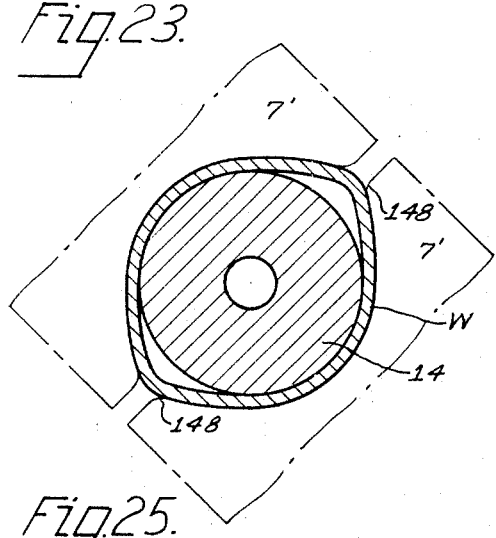

FIGURES 23 to 28 diagrammatically illustrate a typical series of cross-sections of a workpiece passing through a mill embodying the present invention. FIGURE 23 shows the work before it has entered the first roll stand of the mill but with the mandrel 14 within it. It will be noted that the workpiece W has a fairly heavy wall and that there is a little clearance between the workpiece and the mandrel. FIGURES 24, 25, 26 and 27 diagrammatically illustrate the manner in which the area of the work is successively reduced by the rolls 6', 7', 8' and 9'. The grooves in these rolls are somewhat oval cross-section and are rounded where they merge into the cylindrical surface of the rolls as shown at 148. The final reduction in wall thickness takes place in roll stand 9. The zones 149 of the work bulge outwardly to conform to the contour of the roll grooves, while the work is rolled firmly against the mandrel in zones 150. The wall thickness of the work is substantially uniform.

Figure 26:
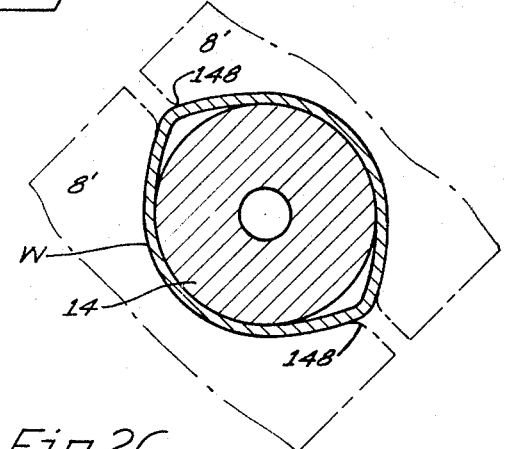
Figure 27:
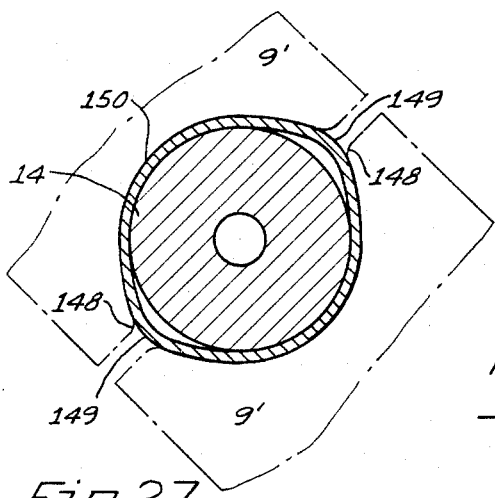

As shown in FIGURE 26, the rolls 10' of the final, or rounding-up, pass are provided with grooves that are substantially semi-circular as shown and the size of the grooves is such that there is essentially no reduction in wall thickness or elongation of the blank as the work passes between the rolls 10'. The action of these rolls is to round up the blank to produce a workpiece with substantially uniform wall thickness and of substantially circular cross-section, and with the work partially, if not entirely, released from the mandrel as indicated by the clearance shown in the drawing. It is not ordinarily necessary to support the work by a mandrel in the rounding-up pass. Successive roll passes of the general character described are known in the art and their design is well within the capabilities of those skilled in the art.

As an example of the typical operation that can be carried out in an apparatus made according to the present invention, a pierced shell having an outside diameter of 8 inches, a wall thickness of 9/16 inch and a length of 30 feet can be reduced to a tubular blank having an outside diameter of 7¼ inches, a wall thickness of about 0.220 inch and a length of about 80.7 feet. A typical entering speed for such a blank (i.e., the lineal speed of the rolls 6') is about 250 feet per minute while the speed of the blank leaving the mill (i.e., the lineal speed of the rolls 10') is about 672 feet per minute. The original blank thus is elongated nearly 2.7 times in its single pass through the mill. For such an operation in a mill having a length of about 17 feet between the centers of the first and last passes, a mandrel bar having an outside diameter of 6.625 inches and a length of about 18 feet is employed, and in the mode of operation shown in FIGURES 11 to 16, the mandrel bar is advanced in the same direction as the movement of the shell at a speed of about 40 feet per minute. At a speed of 40 feet per minute, the mandrel would move about 4.8 feet during the passage of a workpiece through the mill. When the mode of operation shown in FIGURES 17 to 22 is employed for similar work, the mandrel preferably is about 20 feet long and is advanced and retracted a distance of about 5 feet at a speed of about 85 feet per minute.

While two modes of operation of the apparatus have been disclosed in some detail and two examples have been given, it is to be noted that the sizes of the work, reductions taken, the dimensions of the parts, the distances and speeds are only given by way of example and that these and other factors can be varied widely and different modes of operation can be employed without departing from the teachings of the invention. For example, the speed of movement of the mandrel can be varied during the rolling operation. If desired, the mandrel can be advanced rapidly just as the workpiece is being pushed into the bite of the first roll stand 6 in order to assist the entry of the workpiece into the roll stand. Thereafter, the motion of the mandrel can be slowed down. Also if desired, the speed of movement of the mandrel can be increased during the rolling operation. In some instances, it may be desirable to advance the mandrel throughout the major portion of the rolling operation and retract it only at the conclusion of the rolling operation in order to assist in freeing the rolled shell from the mandrel at the time that the trailing end of the shell passes through the last roll stand. It is important, however, that the movement of mandrel be such as to provide the required support for the workpiece wherever and whenever it is required during the rolling operation and to distribute the wear on the mandrel throughout a substantial portion of its length.

While the mandrel movement control beam is shown herein as being operated by screws, it is evident that other appropriate means, such as one or more hydraulic cylinder and piston mechanisms, could be employed.

*Summary.*—From the foregoing description of a preferred form of the invention, it will be evident that the invention provides a method and apparatus for rolling pierced billets or shells with greatly improved results as compared to the operation of either conventional plug mills or full-floating plug mills. In view of the fact that the mill requires only a single pass, the cycle time is much less and the production of the mill is much greater than is possible with a conventional single stand plug mill. A much greater amount of work can be done in a multistand plug mill than in a single stand mill and larger billets and pierced shells can be employed because of the greater reduction possible with the multistand mill. Because of the multistand operation and also because of the lubrication of the interior of the tube and the exterior of the plug, which gives better finish to the interior of the tube, it is frequently possible to eliminate the reeling operations that are conventionally employed with single stand mills. Thus, production rates of the tube mill as a whole can be increased and floor space and capital investment requirements reduced.

As compared to a full-floating mill, the floor space is greatly reduced, the original investment is reduced and the mill has the capability of finishing much larger tubes than full-floating mills. Also, the complicated mandrel-handling mechanism and the large inventory of mandrels required with full-floating mills are eliminated.

In the mill of the present invention since the tube is rolled over an internally cooled mandrel of substantial length which has a controlled movement as the tube progresses through the mill instead of being rolled over a fixed plug with a short working length of from one-half to 1 inch as in a conventional mill, the friction and wear on the mandrel are distributed over a large area. The mandrels are long-lived as compared to conventional plugs and ordinarily produce a smoother and improved internal tube surface. Inasmuch as the rolling time is short, the temperature of the blank at the end of the rolling operation will be very nearly the same as it was at the beginning. This is highly advantageous and assists in producing a more uniform product. Furthermore, because of the heavy wall thickness of the pierced shells that can be rolled in an apparatus made according to the invention, the temperature loss in the shells during handling as well as during rolling is reduced and the tubes are rolled at a higher and more advantageous temperature than in a conventional plug mill.

Inasmuch as the plug and the mandrel bar of the mill are located on the inlet side of the mill, the plug and bar are under tension during the rolling cycle. This arrangement prevents buckling and vibration of the mandrel and the mandrel bar. Also, the length of the mandrel is not a function of the length of the rolled tube leaving the mill as is the case in a conventional full-floating plug mill, but rather depends upon the amount of movement desired and the length of the mill. This permits the production of relatively long lengths of tubing with mandrels that are relatively short as compared to the mandrels required in full-floating mills.

The design of the mill lends itself to automatic control and eliminates the hazards to the operators that are present with conventional plug mills.

Those skilled in the art will appreciate that various changes and modifications can be made in the preferred form of the invention described herein without departing from the spirit and scope of the invention. The essential characteristics of the apparatus and of the method are set forth in the appended claims.

I claim:

1. The method of rolling a tubular blank to elongate it and reduce its diameter which comprises passing the blank continuously through a mill having a plurality of roll stands having grooved rolls providing passes of progressively reduced diameters, supporting the interior of the hubular blank during its passage through each roll stand in which the blank is reduced by an elongated mandrel that is short as compared to the length of the blank after rolling and moving the mandrel in an axial direction with respect to the mill and with respect to the tubular blank during substantially the entire rolling operation at an average speed with respect to the mill that is substantially less than the lineal speed of the rolls at the entry end of the mill and for a distance that is substantially less than the length of the mill between the centers of the first and last passes.

2. The method according to claim 1 wherein the mandrel is moved in the same direction as the tubular blank.

3. The method according to claim 1 wherein the mandrel is moved in a direction opposite to the direction of movement of the tubular blank.

4. The method of rolling a tubular blank to elongate it and reduce its diameter which includes the steps of disposing the blank on the entry side of a mill having a plurality of roll stands having grooved rolls providing passes of progressively reduced diameters, passing an elongated mandrel through the blank and in to the pass of the mill, entering the blank into the entry end of the mill, rolling the blank continuously through the mill over the mandrel, moving the mandrel in an axial direction with respect to both the mill and the blank during substantially the entire rolling operation at an average speed that is much less than the speed of movement of the blank as it enters the mill discharging the rolled blank on the exit side of the mill and withdrawing the mandrel to the inlet side of the mill a distance sufficient to permit another blank to be positioned between the forward end of the mandrel and the mill.

5. The method according to claim 4 wherein the mandrel is moved in the same direction as the tubular blank during the rolling operation.

6. The method according to claim 5 wherein the mandrel is also moved in a direction opposite to the direction of movement of the tubular blank during the rolling operation.

7. The method of rolling a tubular blank to elongate it and reduce its diameter which includes the steps of disposing the blank on the entry side of a mill having a plurality of roll stands having grooved rolls providing passes of progressively reduced diameters, passing an elongated mandrel through the blank and into the pass of the mill with the mandrel extending throughout substantially the entire length of the working pass of the mill, entering the blank into the entry end of the mill, rolling the blank continuously through the mill over the mandrel, moving the mandrel in an axial direction with respect to the mill during substantially the entire rolling operation for a distance that is substantially less than the distance between the centers of the first and last passes, discharging the rolled blank on the exit side of the mill and withdrawing the mandrel to the inlet side of the mill a distance sufficient to permit another blank to be positioned between the forward end of the mandrel and the mill.

8. A method according to claim 7 including the step of ejecting lubricant from the forward portion of the mandrel onto the inner surface of the blank as the mandrel is being passed through the blank and into the mill.

9. A method according to claim 8 including the step of lubricating the exterior of the mandrel immediately before the mandrel is passed through the tubular blank.

10. Apparatus for rolling tubular blanks comprising a mill embodying a pluralty of aligned roll stands adapted to reduce a tubular blank passing therethrough; means at the entry end of the mill for supporting a tubular blank to be rolled; an elongated hollow mandrel adapted to support a blank being rolled in the mill; a hollow mandrel bar extending rearwardly from the mandrel for controlling the position and movement of the mandrel; means for retracting said mandrel bar and mandrel away from said mill to permit a blank to be rolled to be deposited on said supporting means between the forward end of the mandrel and the mill and for advancing said mandrel through said blank to be rolled into the working pass of the mill; and a conduit extending through said mandrel bar for supplying cooling fluid to the interior of the mandrel.

11. Apparatus for rolling tubular blanks comprising a mill embodying a plurality of aligned roll stands adapted to reduce a tubular blank passing therethrough; means at the entry end of the mill for supporting a tubular blank to be rolled; an elongated hollow mandrel adapted to support a blank being rolled in the mill; a hollow mandrel bar extending rearwardly from the mandrel for controlling the position and movement of the mandrel; means for retracting said mandrel bar and mandrel away from said mill to permit a blank to be rolled to be deposited on said supporting means between the forward end of the mandrel and the mill and for advancing said mandrel through said blank to be rolled into the working pass of the mill; a conduit extending through said mandrel bar for supplying cooling fluid to the interior of the mandrel; and a conduit extending through the mandrel bar for supplying lubricant to the mandrel, the mandrel having openings in the forward end thereof to permit discharge of lubricant supplied by said conduit onto the interior of the tubular blank as the mandrel is passed through the blank.

12. Apparatus for rolling tubular blanks comprising a mill embodying a plurality of aligned roll stands adapted to reduce a tubular blank passing therethrough; means at the entry end of the mill for supporting a tubular blank to be rolled; an elongated hollow mandrel adapted to support a blank being rolled in the mill; a hollow mandrel bar extending rearwardly from the mandrel for controlling the position and movement of the mandrel; means for retracting said mandrel bar and mandrel away from said mill to permit a blank to be rolled to be deposited on said supporting means between the forward end of the mandrel and the mill and for advancing said mandrel through said blank to be rolled into the working pass of the mill; a pusher for pushing the blank into the mill, said pusher having an opening through which the mandrel passes and means for lubricating the exterior of the mandrel as it passes through the pusher; and a conduit extending through the mandrel bar for supplying lubricant to the mandrel, the mandrel having openings in the forward end thereof to permit discharge of lubricant supplied by said conduit onto the interior of a tubular blank as the mandrel is passed through the blank.

13. Apparatus for rolling tubular blanks comprising a mill embodying a plurality of aligned roll stands adapted to reduce a tubular blank passing therethrough; means at the entry end of the mill for supporting a tubular blank to be rolled; an elongated hollow mandrel adapted to support a blank being rolled in the mill; a hollow mandrel bar extending rearwardly from the mandrel for controlling the position and movement of the mandrel; a mandrel thrust block secured to the rear end of the mandrel bar, said thrust block being supported for movement in directions toward and away from said mill parallel to the pass line of the mill; means for retracting said mandrel thrust block, mandrel bar and mandrel away from said mill to permit a blank to be rolled to be deposited on said inlet table between the forward end of the mandrel and the mill and for advancing said mandrel through said blank to be rolled to dispose said mandrel within the working pass of the mill; a pusher for pushing the blank into the mill, said pusher having an opening through which the mandrel passes and means for lubricating the exterior of the mandrel as it passes through the pusher; a conduit extending through said mandrel bar for supplying cooling fluid to the interior of the mandrel; a conduit extending through the mandrel bar for supplying lubricant to the mandrel, the mandrel having openings in the forward end thereof to permit discharge of lubricant supplied by said conduit onto the interior of a tubular blank as the mandrel is passed through the blank; and power means for controlling the position of the mandrel during the rolling operation.

14. Apparatus for rolling tubular blanks comprising a continuous mill embodying a plurality of aligned roll stands, each roll stand having at least two grooved rolls defining a roll pass adapted to reduce a tubular blank passing therethrough; means for driving the rolls in the roll stands at progressively greater speeds from the entry to the exit end of the mill; an inlet table disposed at the entry end of the mill for supporting a tubular blank to be rolled in alignment with the working pass of the mill; a mandrel adapted to support the interior of a blank being rolled in the mill, said mandrel having a length at least substantially as long as the working pass of the mill; a mandrel bar for controlling the position and movement of the mandrel, the forward end of the mandrel bar being secured to the rear end of the mandrel; a mandrel thrust block secured to the rear end of the mandrel bar; means for supporting said thrust block for movement in directions toward and away from said mill parallel to the pass line of the mill; means for retracting said mandrel thrust block, mandrel bar and mandrel away from said mill to permit a blank to be rolled to be deposited on said inlet table between the forward end of the mandrel and the mill and for advancing said mandrel thrust block, mandrel bar and mandrel to move said mandrel through a blank positioned on said inlet table to project said mandrel into the working pass of the mill; and a mandrel movement control beam engageable with said mandrel thrust block whereby said mandrel movement control beam can apply forces to said mandrel thrust block in opposition to the forces exerted on the mandrel during the rolling operation; and power means for moving said mandrel movement control beam.

15. Apparatus for rolling tubular blanks comprising a mill embodying a plurality of aligned roll stands, each roll stand having at least two grooved rolls defining a roll pass adapted to reduce a tubular blank passing therethrough; means for driving the rolls in the roll stands at progressively greater speeds from the entry to the exit end of the mill; an inlet table disposed at the entry end of the mill for supporting a tubular blank to be rolled in alignment with the working pass of the mill; a substantially cylindrical mandrel adapted to support the interior of a blank being rolled in the mill, said mandrel having a length at least substantially as long as the working pass of the mill; a mandrel bar for controlling the position and movement of the mandrel, the forward end of the mandrel bar being secured to the rear end of the mandrel; a mandrel thrust block secured to the rear end of the mandrel bar; means for supporting said thrust block for movement in directions toward and away from said mill parallel to the pass line of the mill; means for retracting said mandrel thrust block, mandrel bar and mandrel away from said mill to permit a blank to be rolled to be deposited on said inlet table between the forward end of the mandrel and the mill and for advancing said mandrel thrust block, mandrel bar and mandrel to move said mandrel through a blank positioned on said inlet table to project said mandrel into the working pass of the mill; a clamp engageable with the blank to hold the blank against longitudinal movement on the inlet table; a pusher for pushing the blank into the mill when said clamp is released; a mandrel movement control beam; means for supporting said mandrel movement control beam for movement toward and away from the mill in directions parallel to the pass line of the mill, said mandrel movement control beam being engageable with said mandrel thrust block whereby said mandrel movement control beam can apply forces to said mandrel thrust block in opposition to the forces exerted on the mandrel during the rolling operation; and power means for moving said mandrel movement control beam to control the movement of the mandrel with respect to the mill during the rolling operation.

16. Apparatus for rolling tubular blanks comprising a mill embodying a plurality of aligned roll stands, each roll stand having at least two grooved rolls defining a roll pass adapted to reduce a tubular blank passing therethrough; means for driving the rolls in the roll stands at progressively greater speeds from the entry to the exit end of the mill; an inlet table disposed at the entry end of the mill for supporting a tubular blank to be rolled in alignment with the working pass of the mill; a mandrel adapted to support a blank being rolled in the mill, said mandrel having a length at least substantially as long as the working pass of the mill; a mandrel bar for controlling the position and movement of the mandrel, the forward end of the mandrel bar being secured to the rear end of the mandrel; a mandrel thrust block secured to the rear end of the mandrel bar; a supporting structure extending rearwardly away from the mill and having slideways upon which said mandrel thrust block is slidably supported for movement in directions toward and away from said mill parallel to the pass line of the mill; means for retracting said mandrel thrust block, mandrel bar and mandrel away from said mill to permit a blank to be rolled to be deposited on said inlet table between the forward end of the mandrel and the mill and for advancing said mandrel thrust block, mandrel bar and mandrel to move said mandrel through a blank positioned on said inlet table to project said mandrel into the working pass of the mill comprising chains supported on said supporting structure and secured to said mandrel thrust block and a motor and associated mechanisms for driving said chains to move said mandrel thrust block toward and away from said mill; a clamp engageable with the blank to hold the blank against longitudinal movement on the inlet table; a pusher for pushing the blank into the mill when said clamp is released; a mandrel movement control beam slidably mounted on said supporting structure, said mandrel movement control beam having an opening through which said mandrel bar extends, the rear side of said mandrel movement control beam being engageable by the forward side of said mandrel thrust block whereby said mandrel movement control beam can apply forces to said mandrel thrust block in the rearward direction in opposition to the forces in the forward direction exerted on the mandrel during the rolling operation; and power means for moving said mandrel movement control beam to control the movement of the mandrel with respect to the mill.

17. Apparatus for rolling tubular blanks comprising a mill embodying a plurality of aligned roll stands, each roll stand having at least two grooved rolls defining a roll pass adapted to reduce a tubular blank passing therethrough; means for driving the rolls in the roll stands at progressively greater speeds from the entry to the exit end of the mill; an inlet table disposed at the entry end of the mill for supporting a tubular blank in alignment with the working pass of the mill; a receiving table disposed alongside said inlet table; means for transferring a blank from said receiving table to said inlet table; an outlet table disposed at the exit end of the mill for receiving the rolled blank after it has passed through the mill; an elongated hollow mandrel adapted to support a blank being rolled in the mill, said mandrel having a length at least substantially as long as the working pass of the mill; a hollow mandrel bar for controlling the position and movement of the mandrel, the forward end of the mandrel bar being secured to the rear end of the mandrel; a mandrel thrust block secured to the rear end of the mandrel bar; an inlet table extension extending rearwardly away from the mill from the rear end of the inlet table and having slideways upon which said mandrel thrust block is slidably supported for movement in directions toward and away from said mill parallel to the pass line of the mill; means for retracting said mandrel bar and mandrel away from said mill to permit a blank to be rolled to be deposited on said inlet table and for advancing said mandrel bar and mandrel through said blank to be rolled to dispose said mandrel within the working pass of the mill comprising chains supported on said inlet table extension and secured to said mandrel thrust block and a motor and associated mechanisms for driving said chains to move said mandrel thrust block toward and away from said mill; a clamp engageable with the blank to hold the blank against longitudinal movement on the inlet table; a pusher for pushing the blank into the mill when said clamp is released, said pusher having an opening through which the mandrel passes and means for lubricating the exterior of the mandrel as it passes through the pusher; a conduit extending through said mandrel bar for supplying cooling fluid to the interior of the mandrel; a conduit extending through the mandrel bar for supplying lubricant to the mandrel, the mandrel having openings in the forward end thereof to permit discharge of lubricant supplied by said conduit onto the interior of a tubular blank as the mandrel is passed through the blank; and a mandrel movement control beam slidably mounted on said inlet table extension, said mandrel movement control beam having an opening through which said mandrel bar extends and the rear side of said mandrel movement control beam being engageable by the forward side of said mandrel thrust block whereby said mandrel movement control beam can apply forces to said mandrel thrust block in the rearward direction in opposition to the forces in the forward direction exerted on the mandrel during the rolling operation; and a pair of elongated screws, one screw being supported on each side of said inlet table extension, said screws making threaded engagement with said mandrel movement control beam and power means for driving said screws to move said mandrel movement control beam toward and away from said mill.

References Cited
UNITED STATES PATENTS

| | | | |
|---|---|---|---|
| 954,880 | 4/1910 | Peters | 72—209 |
| 970,263 | 9/1910 | Peters | 72—209 |
| 2,167,418 | 7/1939 | Findlater | 72—209 |
| 2,167,424 | 7/1939 | Novack | 72—209 |
| 2,237,983 | 4/1941 | Findlater | 72—209 |
| 3,101,015 | 8/1963 | Schuetz | 72—209 |

GERALD A. DOST, *Primary Examiner.*